Figure 1:
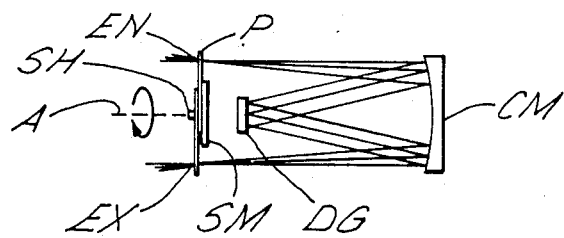

United States Patent [19]

Moss

[11] Patent Number: 4,483,590

[45] Date of Patent: Nov. 20, 1984

[54] ADJUSTABLE SLIT ASSEMBLY FOR A MONOCHROMATOR

[75] Inventor: Anthony R. L. Moss, Cambridge, England

[73] Assignee: U.S. Philips Corporation, New York, N.Y.

[21] Appl. No.: 439,463

[22] Filed: Nov. 5, 1982

[30] Foreign Application Priority Data

Nov. 23, 1981 [GB] United Kingdom ............... 8135219

[51] Int. Cl.$^3$ .............................................. G01J 3/04
[52] U.S. Cl. .................................... 350/273; 356/334
[58] Field of Search ........................... 356/331–334; 350/271, 273–275

[56] References Cited

U.S. PATENT DOCUMENTS

3,508,813 4/1970 Smith, Jr. et al. ................... 356/334

FOREIGN PATENT DOCUMENTS

137117 10/1981 Japan .................................. 356/334

Primary Examiner—F. L. Evans
Attorney, Agent, or Firm—Paul R. Miller

[57] ABSTRACT

An adjustable slit plate assembly for a monochromator is formed by two identical metal plates (P1, P2) each having a set of slits (EX1 to EX6 and EN1 to EX6 respectively) with all the slits disposed on a common circle. The plates (P1, P2) are located and supported on a disc (SM) on a rotatable shaft (SH) at the axis (A) of the circle. The slits are each of minimum length to pass a radiant beam of given energy through the monochromator and each set of slits occupies an arc of substantially minimum length. The shape of each plate is substantially a sector of a further circle whose radius and arc are the minimum necessary to accommodate the slits and the axis. The complete configuration of the plates is formed by etching in a single operation, and a greater number of slit sets can be formed together from a plate of given area than for the prior art case in which the two sets of slits for a slit assembly are formed in a single plate in the shape of a complete disc. A significant cost reduction in the slit assembly is thus achieved.

12 Claims, 3 Drawing Figures

ADJUSTABLE SLIT ASSEMBLY FOR A MONOCHROMATOR

This invention relates to an adjustable slit assembly for a monochromator, the assembly being of the type including slit defining means defining first and second variable width slit means disposed along a common circle, and support means supporting said slit defining means, said slit defining means and support means being rotatable together about an axis at the centre of the circle to bring a pair of selected width portions, one portion from each slit means, to the radiation entrance and exit positions of the monochromator.

A slit assembly of the above type is known from U.K. Patent Specification No. 1,118,969 and also has been used on a significant commercial scale for some years in monochromators for ultra-violet/visible and atomic absorption spectrophotometers. In this published and used slit assembly, each variable width slit means consists of a set of discrete slits, the two sets defining a plurality of pairs of slits, the slits of one pair having different widths from the corresponding slits of other said pairs to form said pairs of selected width portions, and the length of each slit is transverse to a radius of the circle. Furthermore, in this slit assembly the slit defining means is single metal plate in the form of a disc with the plurality of pairs of slits extending around the whole of said common circle.

An object of this invention is to enable the cost of slit assemblies of the above type to be reduced.

According to the invention there is provided an adjustable slit assembly for a monochromator, as described in the opening paragraph of this specification, characterised in that said slit defining means is formed by two separate substantially identical slit plates, each slit plate having a said variable width slit means disposed along an arc of said circle, the arc being of substantially minimum length determined by the number of slit portions in the slit means and the minimum length of each slit portion required to pass a radiant beam of predetermined energy through the monochromator, and the shape of each slit plate being substantially a sector of a further circle, the radius and arc of said sector both being substantially the minimum necessary to accommodate the slit means and the axis of said first-mentioned circle.

The invention is based on the realisation that in batch production processes which may be used to produce the slit defining plates the cost of the slit assemblies is largely dependent on the area of plate used for each slit assembly and the yield of plates in which the slits are within required tolerances.

Figure 2:
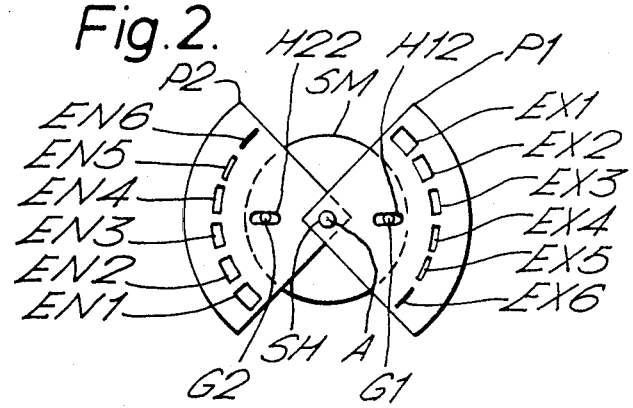
Figure 3:
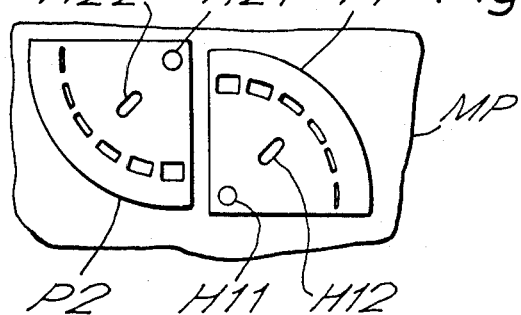

The invention will now be described in more detail with reference to the accompanying drawings, in which:

FIG. 1 is a schematic plan view of a monochromator including an adjustable slit assembly according to the invention, FIG. 2 is an end view of the slit assembly shown in FIG. 1, and FIG. 3 shows the configuration of the two slit plates of the assembly of FIG. 2 in part of a metal plate from which the two slit plates are formed.

Referring now to FIG. 1 there is shown a monochromator of conventional Ebert configuration including an adjustable slit assembly according to the invention. A radiation beam is focussed at a slit EN at the entrance position of the monochromator from where it diverges to a collimator mirror CM. A parallel radiation beam from the collimator mirror CM is dispersed by a diffraction grating DG and directed back to the collimator mirror CM from where it converges and is focussed at a slit EX at the exit position of the monochromator. The slits EN and EX form one of a plurality of pairs of slits, the slits of one pair having different widths from the corresponding slits of other pairs, in slit defining means P which is supported by support means SM. The slit defining means P and the support means SM are rotatable together by means of a shaft SH about an axis A to bring any one selected pair of slits to the radiation entrance and exit positions of the monochromator.

FIG. 2 shows an end view of the slit assembly shown in FIG. 1. There are six pairs of slits formed by a first pair of slits EN1 and EX1 of greatest width and five further pairs of matched slits having successively smaller widths, that is to say a second pair EN2, EX2, a third pair EN3, EX3, a fourth pair EN4, EX4, a fifth pair EN5, EX5, and a sixth pair EN6, EX6. All the slits are curved and are disposed along a common circle having the axis A at the centre of that circle with the length of each slit transverse to the radius of the circle. The slit defining means P of FIG. 1 is formed by two separate indentical slit plates P1 and P2 and the support means SM of FIG. 1 is a plate in the form of disc on the shaft SH on the axis A. Each plate P1, P2 is located in a predetermined position with respect to the other plate and to the axis A by the shaft SH fitting in a first hole in the plate (H11, H21 see FIG. 3) and a peg on the disc, G1 and G2 respectively, fitting in a second hole in the plate, H12 and H22 respectively. The plates P1 and P2 are secured to the disc support means SM by the holes H11, H21 being an interference fit on the shaft SH and by adhesive between the plates and the disc SM. Other means of aligning the slit plates could be used; for example jigging the plates prior to fixing with adhesive, or fixing each plate with a screw into the plate which also acts as a locator, or having two pegs for each plate, one on each side of the plate.

The two slit plates P1, P2 overlap in the region of the shaft SH. In the case where the plates are very thin compared with the radius of the circle on which the slits are disposed in the plates the effect of this overlap on the radius of the slits in the assembly is very small. This small effect could be overcome by thinning down the plates in the overlap region and mounting them back to back so that all the slits are co-planar in the assembly; in this case the two slit plates would still be substantially, although not exactly, identical.

The slits in each plate P1, P2 form a set disposed along an arc of the above-mentioned circle. In each case the arc is of substantially minimum length determined by the number of slits in the set and the minimum length of each slit required to pass a radiant beam of predetermined energy through the monochromator. In an example for use in the monochromator of an ultraviolet/visible spectrophotometer the six slits of each set having widths ranging from a maximum of $2.13 \pm 0.01$ mm to a minimum of $0.016 \pm 0.004$ mm. In this example the radius of the circle along which the slits are disposed is $35 \pm 0.1$ mm, the curved length of each slit is a nominal 7.64 mm based on the slit subtending an angle of $12.5° \pm 0.1°$ and the slits are spaced on a nominal 15° pitch. The symmetry tolerance of the slits, that is to say the tolerance of the mid point of the length of each slit with respect to a predetermined radius of the above-mentioned circle when the plates P1, P2 are located on and secured to the disc SM is ±0.01 mm. The shape of each plate P1, P2 is substantially a sector of a further circle, the radius and arc of this sector both being substantially the minimum necessary to accommodate the set of slits and the hole at the axis A of the first mentioned circle. In the just mentioned example for use in the monochromator of an ultraviolet/visible spectrophotometer, the radius of this further circle is 50 mm and arc of the sector of this further circle formed by each plate P1, P2 subtends an angle of 90°, that is to say the size of the sector is one quarter of the area of the further circle.

In another example for use in the monochromator of an atomic absorption spectrophotometer, a set of four slits each 8 mm in length is formed in each plate P1, P2. The radius of the circle along which the slits are disposed is again 35 mm and the radius of the further circle of which the plates P1, P2 are a sector is again 50 mm. In this case the arc of the sector of the further circle formed by each plate P1, P2 subtends an angle of 60°, that is to say the size of the sector is one sixth of the area of the further circle. The minimum number of slits in each set employed in usual practice in these spectrophotometers is three and in this case the size of the sector of each plate P1, P2 could be approximately one eighth of the area of the further circle.

It may be useful in some spectrophotometer applications to attach a filter to one or other of the slit plates at one or more slit positions. For example, a red filter could cover one of the slits in one of the plates to prevent second order wavelength radiation emerging from the monochromator and impinging on a detector. In this case, again, the two slit plates would be substantially, although not exactly, identical.

Referring now to FIG. 3, the configuration of the two slit plates P1, P2 is shown in part of a metal plate MP from which the two slit plates are formed. In the examples mentioned above, the metal plate MP is 0.1 mm thick nickel and the complete configuration of each plate P1, P2 consisting of the sector with the set of slits and two holes is formed by etching in a single operation. It will now be appreciated that for a given size of the plate MP at least double the number of pairs of slit plates P1, P2 can be formed in a single operation compared with the number of complete discs having the same number of pairs of slits on the same circle. Furthermore if a single slit is not successfully formed to the required tolerance only one set of slits, that is to say one of the two sector plates shown, need be rejected compared with the rejection of two sets of slits if the two sets were formed in a complete disc. The smaller area of the metal plate MP required for each slit assembly together with the improved yield leads to a substantial cost reduction for the slit assembly.

The advantage of cost reduction in using two substantially identical minimum size slit plates for each slit assembly can also be obtained if, instead of making the slit plates as metal plates with apertures therein forming the slits, the slit plates are made as coated transparent material, e.g. aluminium coated silica, with apertures in the coating forming the slits.

In the above description with respect to FIGS. 1 to 3, the slit assembly comprises two sets of discrete slits. Each set of slits can be considered as variable width slit means of which a selected width portion may be positioned at the entrance or exit position of the monochromator. Each variable width slit means could instead be a single continuous slit whose width varies either continuously or in steps.

I claim:

1. An adjustable slit assembly for a monochromator, including slit defining means defining first and second variable width slit means disposed along a common circle, and support means supporting said slit defining means, said slit defining means and support means being rotatable together about an axis at the centre of the circle to bring a pair of selected width portions, one portion from each slit means, to the radiation entrance and exit positions of the monochromator, characterised in that said slit defining means is formed by two separate substantially identical slit plates, each slit plate having said variable width slit means disposed along an arc of said circle, the arc being of substantially minimum length determined by the number of slit portions in the slit means and the minimum length of each slit portion required to pass a radiant beam of predetermined energy through the monochromator, and the shape of each slit plate being substantially a sector of a further circle, the radius and arc of said sector both being substantially the minimum necessary to accommodate the slit means and the axis of said first-mentioned circle.

2. A slit assembly as claimed in claim 1, in which each variable width slit means consists of a set of discrete slits, the two sets defining a plurality of pairs of slits, the slits of one pair having different widths from the corresponding slits of other said pairs to form said pairs of selected width portions, and the length of each slit being transverse to a radius of the circle.

3. A slit assembly as claimed in claim 2, in which the number of slits in each set is in the range 3 to 6, and in which the size of said sector is in the range of approximately one quarter to one eighth of the area of said further circle.

4. A slit assembly as claimed in claim 3, in which said support means is a support plate on a shaft on said axis, and in which each slit plate is located in a predetermined position with respect to the axis by the shaft fitting in a hole in the slit plate.

5. A slit assembly as claimed in claim 4, in which each slit plate is aligned with respect to the other slit plate by a peg on the support plate fitting in a further hole in the slit plate.

6. A slit assembly as claimed in claim 5, in which each slit plate is a metal plate whose complete configuration is formed by etching in a single operation.

7. A slit assembly as claimed in claim 2, in which said support means is a support plate on a shaft on said axis, and in which each slit plate is located on a predetermined position with respect to the axis by the shaft fitting in a hole in the slit plate.

8. A slit assembly as claimed in claim 1, in which said support means is a support plate on a shaft on said axis, and in which each slit plate is located in a predetermined position with respect to the axis by the shaft fitting in a hole in the slit plate.

9. A slit assembly as claimed in claim 4, in which each slit plate is a metal plate whose complete configuration is formed by etching in a single operation.

10. A slit assembly as claimed in claim 3, in which each slit plate is a metal plate whose complete configuration is formed by etching in a single operation.

11. A slit assembly as claimed in claim 2, in which each slit plate is a metal plate whose complete configuration is formed by etching in a single operation.

12. A slit assembly as claimed in claim 1, in which each slit plate is a metal plate whose complete configuration is formed by etching in a single operation.

* * * * *